United States Patent
Heine et al.

(10) Patent No.: US 8,375,171 B2
(45) Date of Patent: Feb. 12, 2013

(54) SYSTEM AND METHOD FOR PROVIDING L2 CACHE CONFLICT AVOIDANCE

(75) Inventors: Daniel Heine, Warminster, PA (US); Eric Aho, Phoenixville, PA (US)

(73) Assignee: Unisys Corporation, Blue Bell, PA (US)

( * ) Notice: Subject to any disclaimer, the term of this patent is extended or adjusted under 35 U.S.C. 154(b) by 215 days.

(21) Appl. No.: 12/756,535

(22) Filed: Apr. 8, 2010

(65) Prior Publication Data

US 2011/0252202 A1 Oct. 13, 2011

(51) Int. Cl.
*G06F 12/00* (2006.01)
*G06F 13/00* (2006.01)
*G06F 13/28* (2006.01)

(52) U.S. Cl. ............... 711/141; 711/E12.017
(58) Field of Classification Search .............. 711/141, 711/E12.017

See application file for complete search history.

(56) References Cited

U.S. PATENT DOCUMENTS

| | | | | |
|---|---|---|---|---|
| 5,611,058 A | * | 3/1997 | Moore et al. | 710/311 |
| 6,430,654 B1 | * | 8/2002 | Mehrotra et al. | 711/118 |
| 6,546,465 B1 | * | 4/2003 | Bertone | 711/144 |
| 2002/0188821 A1 | * | 12/2002 | Wiens et al. | 711/220 |
| 2003/0140195 A1 | * | 7/2003 | Borkenhagen et al. | 711/118 |
| 2004/0210719 A1 | * | 10/2004 | Bushey et al. | 711/119 |
| 2008/0301378 A1 | * | 12/2008 | Carrie | 711/147 |

* cited by examiner

*Primary Examiner* — Sheng-Jen Tsai
(74) *Attorney, Agent, or Firm* — Richard J. Gregson

(57) ABSTRACT

A system provides a cache memory coherency mechanism within a multi-processor computing system utilizing a shared memory space across the multiple processors. The system possesses a store address list for storing cache line addresses corresponding to a cache line write request issued by one of the multiple processors, a fetch address list for storing cache line addresses corresponding to a cache line fetch request issued by one of the multiple processors, a priority and pipeline module, a request tracker module and a read/write address list. The store address list and the fetch address list are queues containing result in cache lookup requests being done by the priority and pipeline module; and each entry in the store address list and the fetch address list possess status bits which indicate the state of the request.

8 Claims, 10 Drawing Sheets

SYSTEM AND METHOD FOR PROVIDING L2 CACHE CONFLICT AVOIDANCE

TECHNICAL FIELD

The current invention relates generally to data processing systems, and more particularly to systems and methods for providing cache coherency between cells having multiple processors.

BACKGROUND

A multiprocessor environment can include a shared memory including shared lines of cache. In such a system, a single line of cache may be used or modified by one processor in the multiprocessor system. In the event a second processor desires to use that same line of cache, the possibility exists for contention. Ownership and control of the specific line of cache is preferably managed so that different sets of data for the same line of cache do not appear in different processors at the same time. It is therefore desirable to have a coherent management system for cache in a shared cache multiprocessor environment.

Within a coherent management system for cache in a shared cache multiprocessor environment, various mechanisms may be used to determine when a cache line is to be evicted from the cache memory in order to permit another cache line to be stored in the cache memory in place of the evicted line. Certain problems may exist in these mechanisms that may be improved with the use of the present invention. The present invention addresses the aforementioned needs and solves them with additional advantages as expressed herein.

SUMMARY OF THE INVENTION

In accordance with the present invention, the above and other problems are solved by providing an improved cache memory coherency system within a multi-processor system that utilizes a shared address space across the various multiple processors.

In one embodiment of the invention, a system provides a cache memory coherency mechanism within a multi-processor computing system utilizing a shared memory space across the multiple processors. The system possesses a store address list for storing cache line addresses corresponding to a cache line write request issued by one of the multiple processors, a fetch address list for storing cache line addresses corresponding to a cache line fetch request issued by one of the multiple processors, a priority and pipeline module, a request tracker module and a read/write address list. The store address list and the fetch address list are queues containing result in cache lookup requests being done by the priority and pipeline module; and each entry in the store address list and the fetch address list possess status bits which indicate the state of the request.

These and various other features as well as advantages, which characterize the present invention, will be apparent from a reading of the following detailed description and a review of the associated drawings.

BRIEF DESCRIPTION OF THE DRAWINGS

Referring now to the drawings in which like reference numbers represent corresponding parts throughout.

DETAILED DESCRIPTION

This application relates in general to a method, apparatus, and article of manufacture for providing a publication/subscription process for transmitting selected information to individual subscribing users from a larger set of information based upon individually specified criteria that uses an inverse query decision process.

Figure 1A:
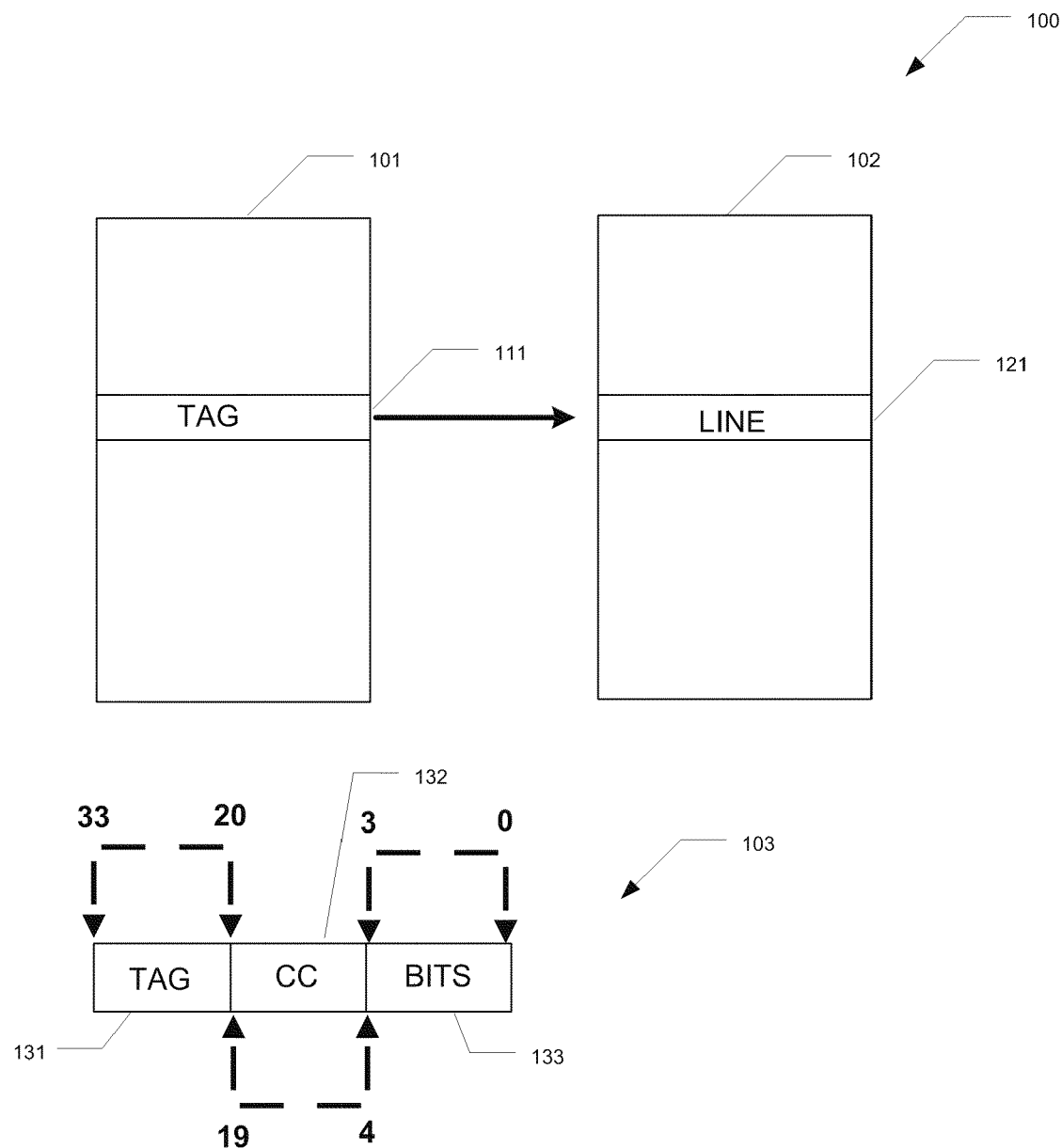
FIGS. 1a and 1b illustrate a data memory queue structures having deficiencies to be addressed by the present invention.
Figure 1B:
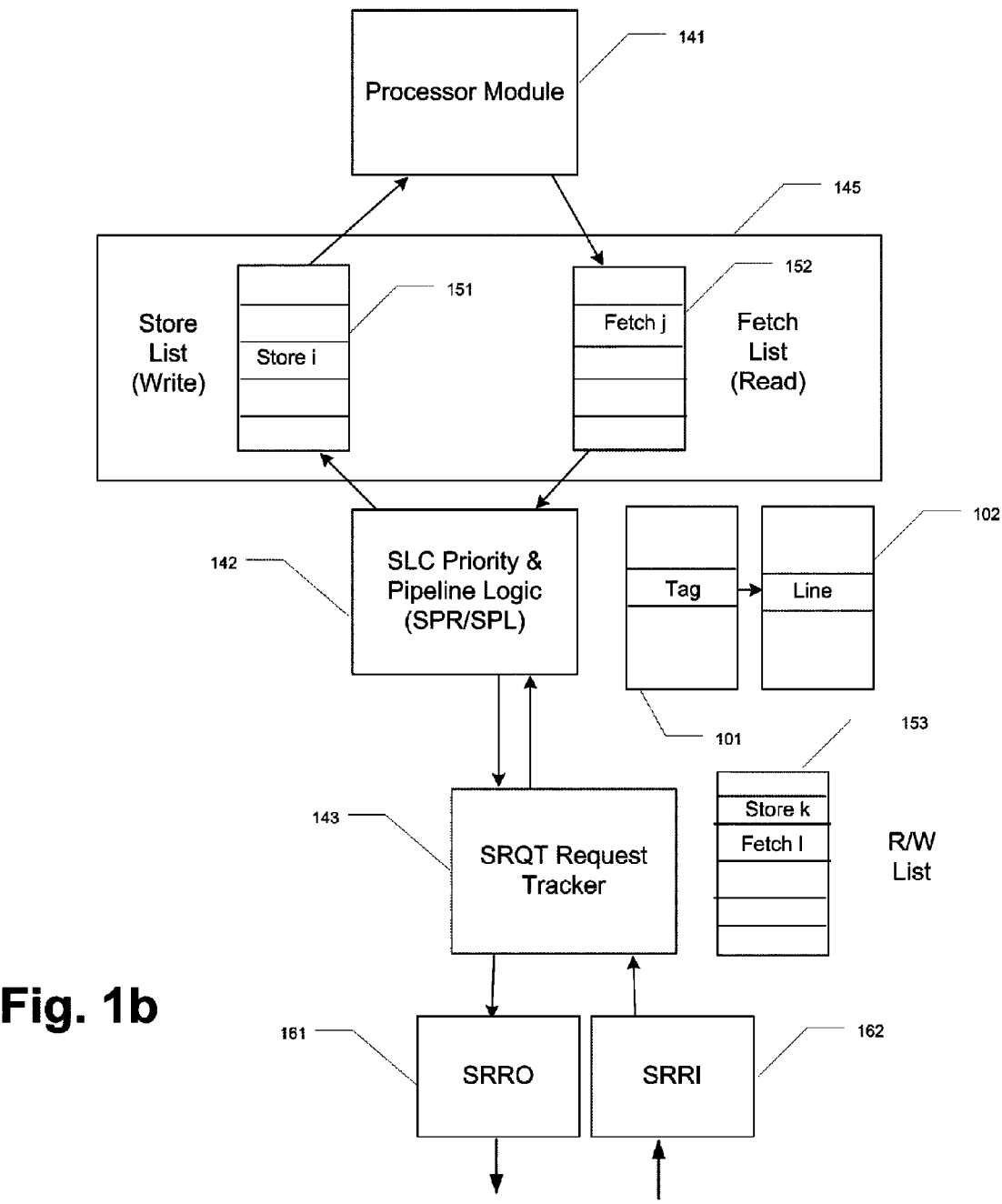

FIGS. 1a and 1b illustrates a data memory queue structures having deficiencies to be addressed by the present invention. FIG. 1a illustrates an embodiment of a memory cache structure 100 that includes a tag memory 101 and a coherency class memory 102. A memory address 103 is used to access data within the cache memory 100. The memory address 103 comprises three components a tag address [33:20] 131, a congruence class address [19:4] 132, and Bits [3:0] 133. Bits [3:0] determine the size of a cache line, which is typically 16 words. All of the cache transactions (reads and writes) deal with cache lines, at least with respect to the memory. The congruence class is used to address the Tag Ram, so it's technically the "tag address." The Tag, on the other hand, is what's stored in the Tag Ram. The SLC is direct mapped, meaning that a given memory address has just one location it can be written into the Tag Ram.

The tag address 131 addresses status data within tag memory 101. The entry within the tag memory corresponds to a cache line 121 stored within the cache coherency memory 102. The size of the cache line 121 within the cache coherency memory 102 is determined by the number of bits addressed by the cache coherency address 132. The number of cache lines supported is determined by the number of bits addressed by the tag address 131. The particular embodiment of the present invention uses 20 bits for the cache coherency address 132 and 13 bits for the tag address 131. One of ordinary skill in the art will recognize that other sized address fields may be used for the tag address 131 and the cache coherency address 132 without deviating from the spirit and scope of the present invention as recited within the attached claims.

FIG. 1b illustrates an embodiment of a cache coherency processing system according to the present invention. The second level cache module (SLC) 140 is a direct-mapped write-back cache with a 7 MB capacity. The method that the SLC module 140 uses to prevent a new read request from being sent to memory when there is a previous write request to the same address that is still outstanding. For a request to be considered complete, the SLC module 140 must receive a response from the memory indicating that the request has been completed. In various embodiments, priority ("SPR") and pipeline ("SPL") logic resides in separate logic blocks for legacy reasons. Conceptually the two blocks are tightly coupled and may be thought of as one logic block that is referred to as an SPR.

The SLC module 140 uses two mechanisms to track requests from the processor module. The first is the store address list (SAL) 151 and the fetch list (FL) 152. These lists contain the addresses for which the processor has issued a store or fetch request respectively. Each of these lists are queues and result in cache lookup requests being done into the SLC priority and pipeline logic module (SPR/SPL) 142. Each entry in the SAL 151 and FL 152 have status bits which indicate the state of the request. One such state is the deferred state. A request enters the deferred state if the cache line 121 in the congruence class memory 102 of the request matches the cache line 121 in the congruence class memory 102 of another previous request in the SAL 151 and FL 152. When a request is in the deferred state, the request is prevented from entering SPR/SPL module 142. A request is removed from the deferred state when the conflicting request is invalidated.

The second mechanism used by the SLC module 140 to track requests is the request tracker module (SRQT) 143. The SRQT module 143 contains lists of the read and write requests 153 that the SLC module 140 has made to the memory. Each request from the SAL 151 or FL 152 can result in a read request when the address in question is not in the cache 102 and can also result in a write request when another address of the same cache line 121 in the congruence class memory 102 is owned by the SLC module 140 and must be evicted to allow the new request to be placed in the cache 102. In order to prevent a second read request from being sent for the same address, the reads and writes caused by a fetch or a store are linked in SRQT module 143. When a read request completes, the data is sent to the processor module 141 and the data cache, but the SAL 151 or FL 152 entry is not cleared unless the write request has also completed. If the write request has not completed when the read request completes, then the SAL 151 or FL152 entry will be invalidated at the time of the write completion. This serves to keep any subsequent requests from the processor to the same cache line in the congruence class memory in the deferred state until the write request completes. This prevents the possibility of a read request to the same address being sent to the memory before a previous write request completes. This is required because the memory does not support multiple requests from the same requestor to a single address at the same time.

Figure 2A:
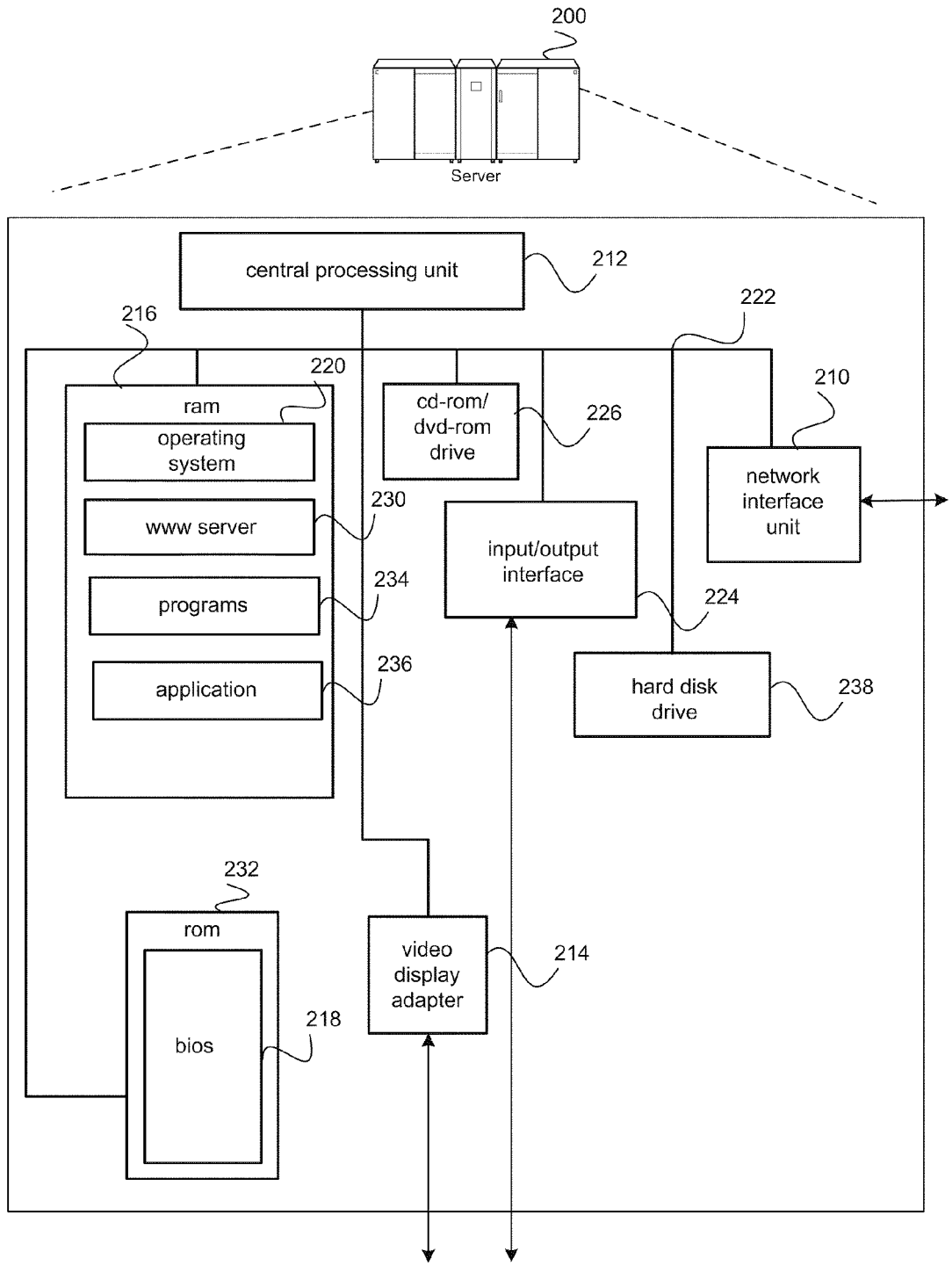
FIGS. 2a-c illustrate various embodiments of a general purpose computing systems for use in implementing as one or more computing embodiments of the present invention.

With reference to FIG. 2a, an exemplary system for implementing the invention includes a general-purpose computing device in the form of a conventional personal computer 200, including a processor unit 202, a system memory 204, and a system bus 206 that couples various system components including the system memory 204 to the processor unit 200. The system bus 206 may be any of several types of bus structures including a memory bus or memory controller, a peripheral bus and a local bus using any of a variety of bus architectures. The system memory includes read only memory (ROM) 208 and random access memory (RAM) 210. A basic input/output system 212 (BIOS), which contains basic routines that help transfer information between elements within the personal computer 200, is stored in ROM 208. The present invention applies to data cache mechanisms within processing unit 202 and/or between multiple processing units used in place of processing unit 202.

The personal computer 200 further includes a hard disk drive 212 for reading from and writing to a hard disk, a magnetic disk drive 214 for reading from or writing to a removable magnetic disk 216, and an optical disk drive 218 for reading from or writing to a removable optical disk 219 such as a CD ROM, DVD, or other optical media. The hard disk drive 212, magnetic disk drive 214, and optical disk drive 218 are connected to the system bus 206 by a hard disk drive interface 220, a magnetic disk drive interface 222, and an optical drive interface 224, respectively. The drives and their associated computer-readable media provide nonvolatile storage of computer readable instructions, data structures, programs, and other data for the personal computer 200.

Although the exemplary environment described herein employs a hard disk, a removable magnetic disk 216, and a removable optical disk 219, other types of computer-readable media capable of storing data can be used in the exemplary system. Examples of these other types of computer-readable mediums that can be used in the exemplary operating environment include magnetic cassettes, flash memory cards, digital video disks, Bernoulli cartridges, random access memories (RAMs), and read only memories (ROMs).

A number of program modules may be stored on the hard disk, magnetic disk 216, optical disk 219, ROM 208 or RAM 210, including an operating system 226, one or more application programs 228, other program modules 230, and program data 232. A user may enter commands and information into the personal computer 200 through input devices such as a keyboard 234 and mouse 236 or other pointing device. Examples of other input devices may include a microphone, joystick, game pad, satellite dish, and scanner. These and other input devices are often connected to the processing unit 202 through a serial port interface 240 that is coupled to the system bus 206. Nevertheless, these input devices also may be connected by other interfaces, such as a parallel port, game port, or a universal serial bus (USB). A monitor 242 or other type of display device is also connected to the system bus 206 via an interface, such as a video adapter 244. In addition to the monitor 242, personal computers typically include other peripheral output devices (not shown), such as speakers and printers.

The personal computer 200 may operate in a networked environment using logical connections to one or more remote computers, such as a remote computer 246. The remote computer 246 may be another personal computer, a server, a router, a network PC, a peer device or other common network node, and typically includes many or all of the elements described above relative to the personal computer 200. The network connections include a local area network (LAN) 248 and a wide area network (WAN) 250. Such networking environments are commonplace in offices, enterprise-wide computer networks, intranets, and the Internet.

When used in a LAN networking environment, the personal computer 200 is connected to the local network 248 through a network interface or adapter 252. When used in a WAN networking environment, the personal computer 200 typically includes a modem 254 or other means for establishing communications over the wide area network 250, such as the Internet. The modem 254, which may be internal or external, is connected to the system bus 206 via the serial port interface 240. In a networked environment, program modules depicted relative to the personal computer 200, or portions thereof, may be stored in the remote memory storage device. It will be appreciated that the network connections shown are exemplary, and other means of establishing a communications link between the computers may be used.

Figure 2B:
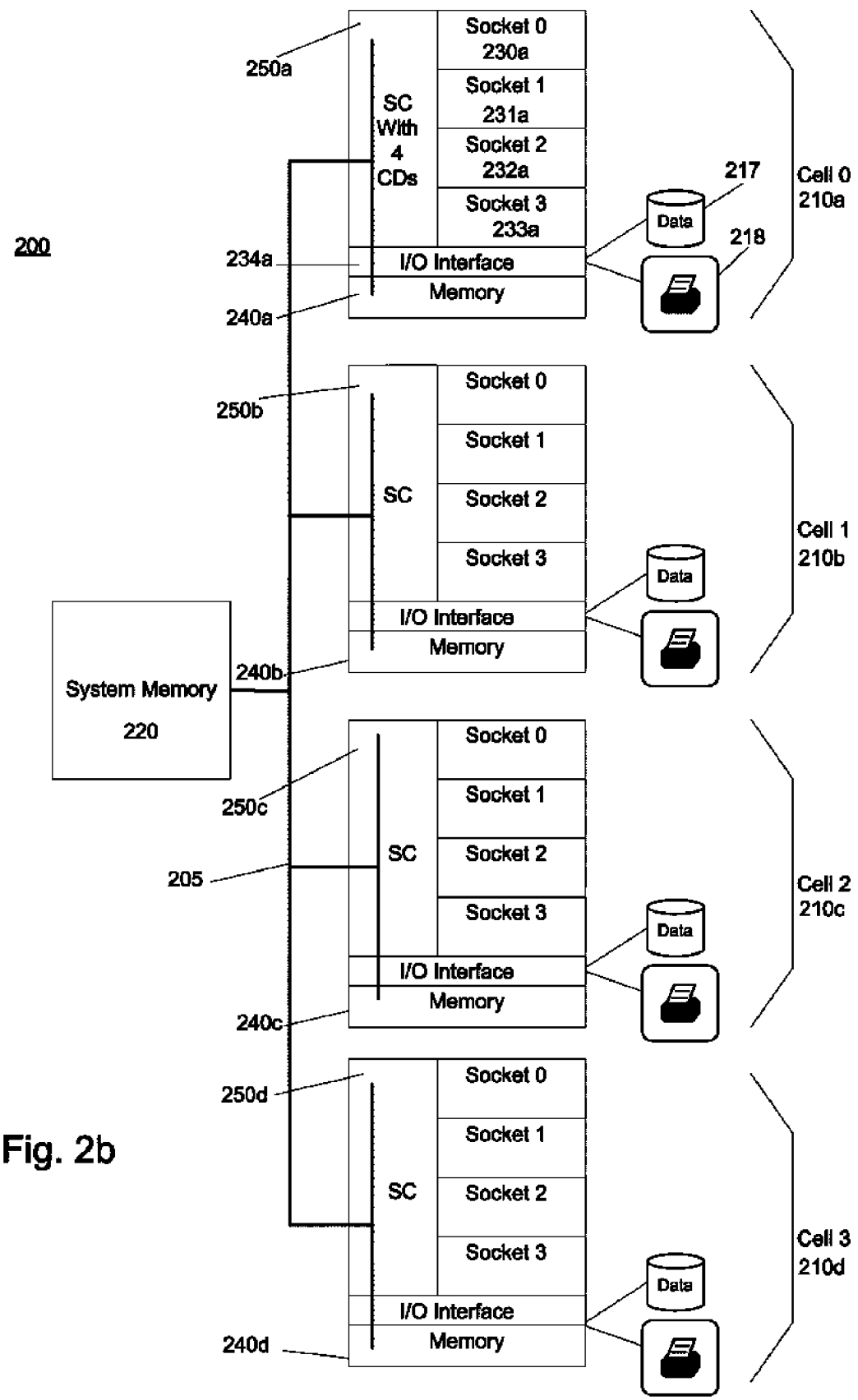

FIG. 2b is a block diagram of a shared multiprocessor system (SMP) 200. In this example, a system is constructed from a set of cells 210a-210d that are connected together via a high-speed data bus 205. Also connected to the bus 205 is a system memory module 220. In alternate embodiments (not shown), high-speed data bus 205 may also be implemented using a set of point-to-point serial connections between modules within each cell 410a-410d, a set of point-to-point serial connections between cells 210a-210d, and a set of connections between cells 210a-210d and system memory module 220.

Within each cell, a set of sockets (socket 0 through socket 3) are present along with system memory and I/O interface modules organized with a system controller. For example, cell 0 210a includes socket 0, socket 1, socket 2, and socket 3 230a-233a, I/O interface module 234a, and memory module 240a hosted within a system controller. Each cell also contains coherency directors, such as CD 250a-250d that contains intermediate home and caching agents to extend cache sharing between cells. A socket is a set of one or more processors with associated cache memory modules used to perform various processing tasks. These associated cache modules may be implemented as a single level cache memory and a multi-level cache memory structure operating together with a programmable processor. Peripheral devices 217-218 are connected to I/O interface module 234a for use by any tasks executing within system 200. All of the other cells 210b-210d within system 400 are similarly configured with multiple processors, system memory and peripheral devices. While the example shown in FIG. 2b illustrates cells 0 through cells 3 210a-210d as being similar, one of ordinary skill in the art will recognize that each cell may be individually configured to provide a desired set of processing resources as needed.

Memory modules 240a-240d provide data caching memory structures using cache lines along with directory structures and control modules. A cache line used within socket 2 232a of cell 0 210a may correspond to a copy of a block of data that is stored elsewhere within the address space of the processing system. The cache line may be copied into a processor's cache memory by the memory module 240a when it is needed by a processor of socket 2 232a. The same cache line may be discarded when the processor no longer needs the data. Data caching structures may be implemented for systems that use a distributed memory organization in which the address space for the system is divided into memory blocks that are part of the memory modules 240a-240d. Data caching structures may also be implemented for systems that use a centralized memory organization in which the memory's address space corresponds to a large block of centralized memory of a system memory block 220.

The SC 250a and memory module 240a control access to and modification of data within cache lines of its sockets 230a-233a as well as the propagation of any modifications to the contents of a cache line to all other copies of that cache line within the shared multiprocessor system 200. Memory-SC module 440a uses a directory structure (not shown) to maintain information regarding the cache lines currently in used by a particular processor of its sockets. Other SCs and memory modules 240b-240d perform similar functions for their respective sockets 230b-230d.

Figure 2C:
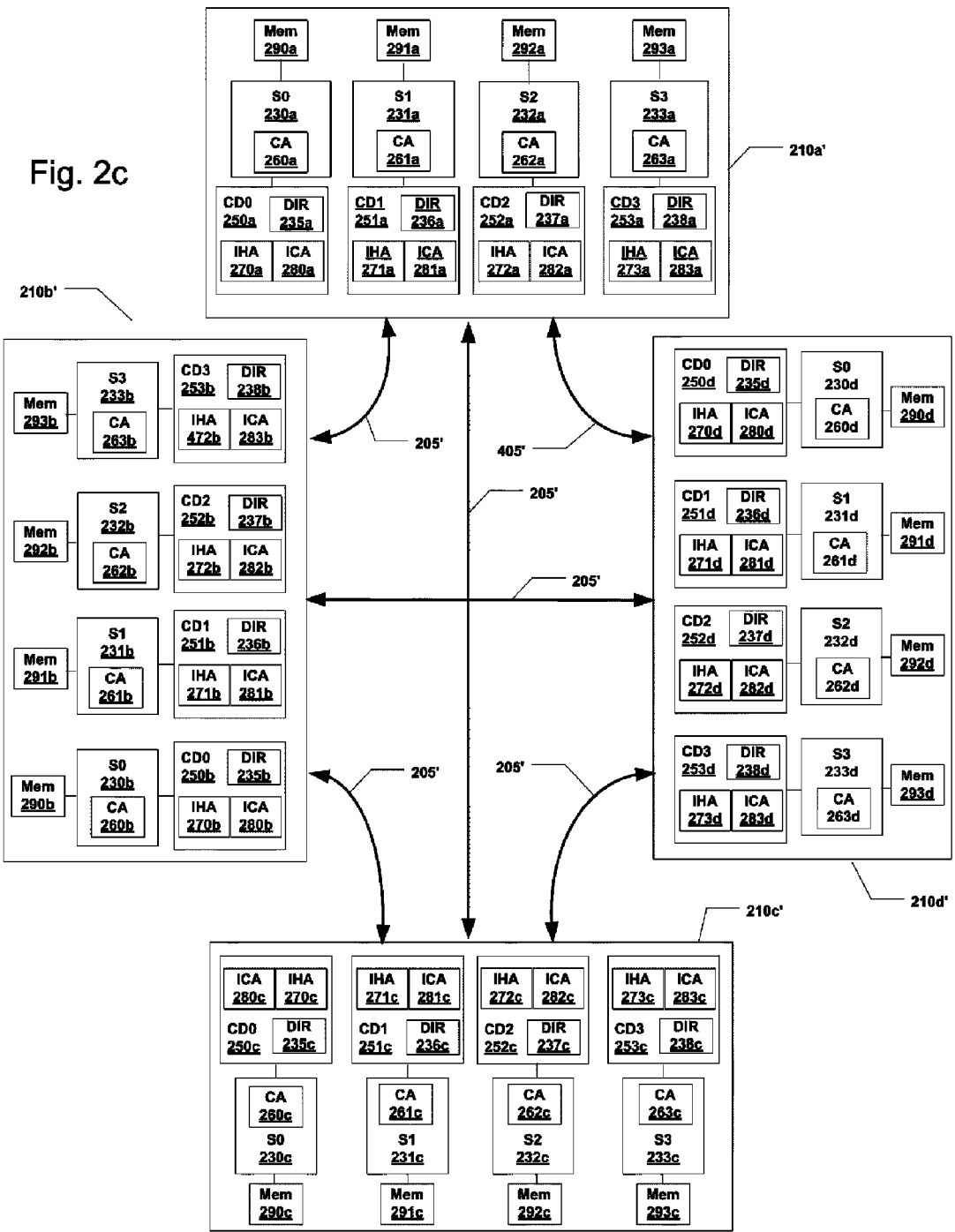

FIG. 2c depict the SMS of FIG. 2b with some modifications to detail some example transactions between cells that seek to share one or more lines of cache. One characteristic of a cell, such as in FIG. 2b, is that all or just one of the sockets in a cell may be populated with a processor. Thus, single processor cells are possible as are four processor cells. The modification from cell 210a in FIG. 2b to cell 210a' in FIG. 2c is that cell 210a' shows a single populated socket and one CD supporting that socket. Each CD having an ICA, an IHA, and a remote directory. In addition, a memory block is associated with each socket. The memory may also be associated with the corresponding CD module. A remote directory (RDIR) module in the CD module may also be within the corresponding socket and stored within the memory module. Thus, example cell 410a' contains four CD's, CD0 250a, CD1 251a, CD2 52a, CD3 253a each having a corresponding DIR, IHA and ICA, communicating with a single socket and cashing agent within a multiprocessor assembly and an associated memory.

In cell 210a', CD0 250a contains IHA 270a, ICA 280a, remote directory 235a. CD0 250a also connects to an assembly containing cache agent CA 260a, and socket S0 230a which is interconnected to memory 290a. CD1 251a contains IHA 271a, ICA 281a, remote directory 235a. CD1 251a also connects to an assembly containing cache agent CA 261a, and socket S1 231a which is interconnected to memory 291a. CD2 252a contains IHA 272a, ICA 282a, remote directory 236a. CD1 252a also connects to an assembly containing cache agent CA 262a, and socket S2 232a which is interconnected to memory 292a. CD2 252a contains IHA 272a, ICA 282a, remote directory 237a. CD2 252a also connects to an assembly containing cache agent CA 262a, and socket S2 232a that is interconnected to memory 292a. CD3 253a contains IHA 273a, ICA 283a, remote directory 238a. CD3 253a also connects to an assembly containing cache agent CA 263a, and socket S3 233a that is interconnected to memory 293a.

In cell 410b', CD0 250b contains IHA 270b, ICA 280b, remote directory 235b. CD0 250b also connects to an assembly containing cache agent CA 260b, and socket S0 230b which is interconnected to memory 290b. CD1 251b contains IHA 271b, ICA 281b, remote directory 235b. CD1 251b also connects to an assembly containing cache agent CA 261b, and socket S1 231b which is interconnected to memory 291b. CD2 252b contains IHA 272b, ICA 282b, remote directory 236b. CD1 252b also connects to an assembly containing cache agent CA 262b, and socket S2 232b that is interconnected to memory 292b. CD2 252b contains IHA 272b, ICA 282b, remote directory 237b. CD2 252b also connects to an assembly containing cache agent CA 262b, and socket S2 232b that is interconnected to memory 292b. CD3 253b contains IHA 273b, ICA 283b, remote directory 238b. CD3 253b also connects to an assembly containing cache agent CA 263b, and socket S3 233b that is interconnected to memory 293b.

In cell 210c', CD0 250c contains IHA 270c, ICA 280c, remote directory 235c. CD0 250c also connects to an assembly containing cache agent CA 260c, and socket S0 230c that is interconnected to memory 290c. CD1 251c contains IHA 271c, ICA 281c, remote directory 236c. CD1 251c also connects to an assembly containing cache agent CA 261c, and socket S1 231c that is interconnected to memory 291c. CD2 252c contains IHA 272c, ICA 282c, remote directory 237c. CD1 252c also connects to an assembly containing cache agent CA 262c, and socket S2 232c that is interconnected to memory 292c. CD2 252c contains IHA 272c, ICA 282c, remote directory 237c. CD2 252c also connects to an assembly containing cache agent CA 262c, and socket S2 232c that is interconnected to memory 292c. CD3 253c contains IHA 273c, ICA 283c, remote directory 238c. CD3 253c also connects to an assembly containing cache agent CA 263c, and socket S3 233c that is interconnected to memory 293c.

In cell 410d', CD0 250d contains IHA 270d, ICA 280d, remote directory 235d. CD0 250d also connects to an assembly containing cache agent CA 260d, and socket S0 230d that is interconnected to memory 290d. CD1 251d contains IHA 271d, ICA 281d, remote directory 236d. CD1 251d also connects to an assembly containing cache agent CA 261d, and socket S1 231d that is interconnected to memory 291d. CD2 252d contains IHA 272d, ICA 282d, remote directory 237d. CD1 252d also connects to an assembly containing cache agent CA 262d, and socket S2 232d which is interconnected to memory 292d. CD2 252d contains IHA 272d, ICA 282d, remote directory 237d. CD2 252d also connects to an assembly containing cache agent CA 262d, and socket S2 232d which is interconnected to memory 292d. CD3 253d contains IHA 273d, ICA 283d, remote directory 238d. CD3 253d also connects to an assembly containing cache agent CA 263d, and socket S3 233d which is interconnected to memory 293d.

The present invention operates within coherency controller modules (SLC module 140) within the various IHA and ICA modules within the processor sockets described above with respect to FIGS. 2b-c. One of ordinary skill in the art will recognize that the present invention may also be used in other embodiments of memory cache systems in multiprocessor architectures consistent with the systems and methods recited within the attached claims.

One of ordinary skill in the art will recognize that additional components, peripheral devices, communications interconnections and similar additional functionality may also be included within shared multiprocessor system 400 without departing from the spirit and scope of the present invention as recited within the attached claims. The embodiments of the invention described herein are implemented as logical operations in a programmable computing system having connections to a distributed network such as the Internet. System 400 can thus serve as either a stand-alone computing environment or as a server-type of networked environment. The logical operations are implemented (1) as a sequence of computer implemented steps running on a computer system and (2) as interconnected machine modules running within the computing system. This implementation is a matter of choice dependent on the performance requirements of the computing system implementing the invention. Accordingly, the logical operations making up the embodiments of the invention described herein are referred to as operations, steps, or modules. It will be recognized by one of ordinary skill in the art that these operations, steps, and modules may be implemented in software, in firmware, in special purpose digital logic, and any combination thereof without deviating from the spirit and scope of the present invention as recited within the claims attached hereto.

Operation of cache coherence systems that may be used in conjunction with the present invention are described in more detail in the following commonly assigned U.S. patent applications: U.S. application Ser. No. 11/540,886 filed Sep. 29, 2006, entitled "Providing Cache Coherency In An Extended Multiple Processor Environment,"; U.S. application Ser. No. 11/540,276 filed Sep. 29, 2006, entitled "Tracking Cache Coherency In An Extended Multiple Processor Environment",; U.S. application Ser. No. 11/540,277 filed Sep. 30, 2006, entitled "Preemptive Eviction Of Cache Lines From A Directory"; and U.S. application Ser. No. 11/540,273 filed Sep. 30, 2006, entitled "Dynamic Presence Vector Scaling in a Coherency Directory". All of these applications are incorporated herein by reference in its entirety.

Figure 3:
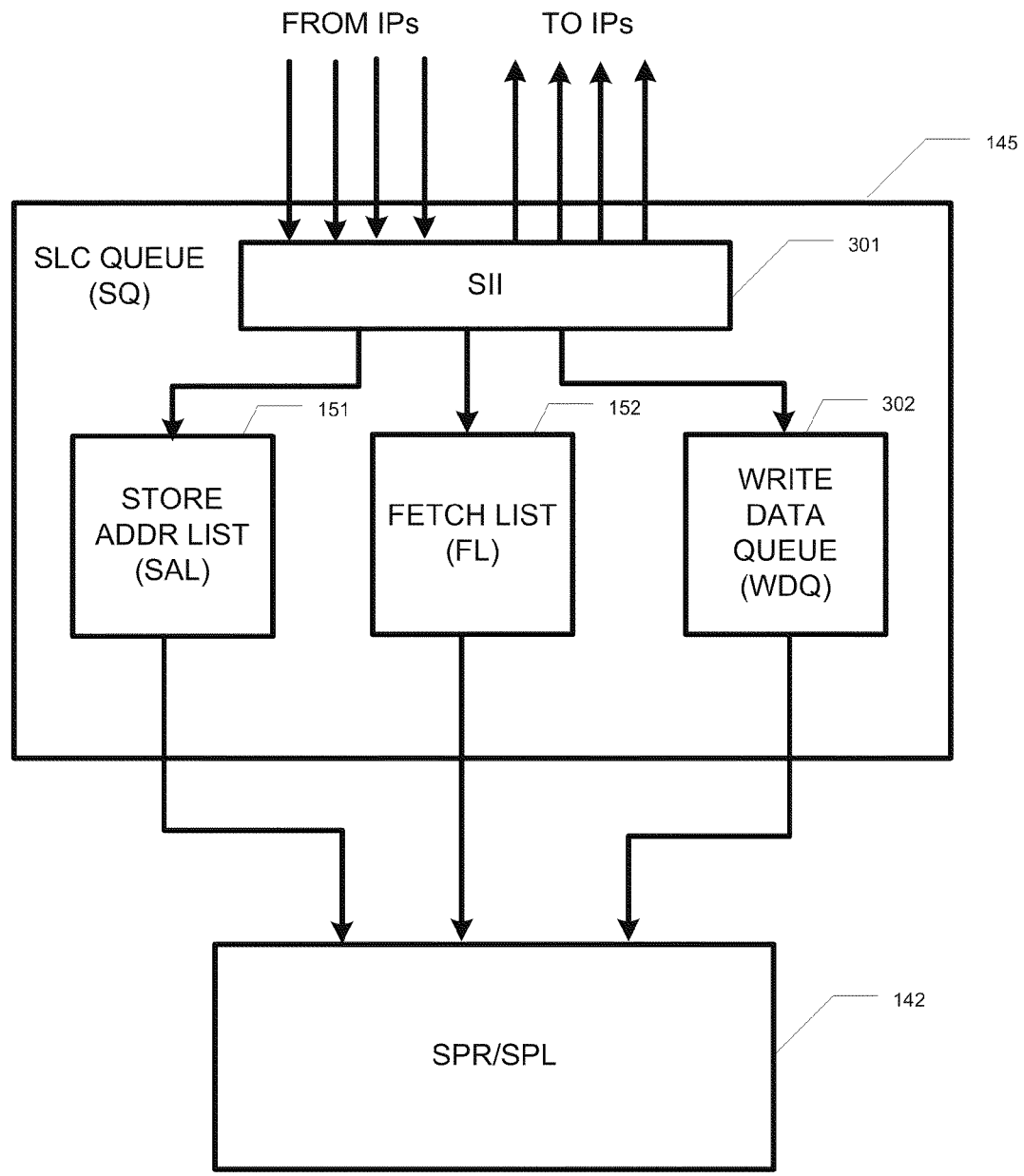
FIG. 3 illustrates an SLC Queue module block diagram according to one embodiment of the present invention.

FIG. 3 illustrates an SLC Queue module 145 block diagram according to one embodiment of the present invention. The SLC Queue (SQ) module 145 consists of four major blocks: IP Input module (SII) 301, Store Address List (SAL) 151, Fetch List (FL) 152, and Write Data Queue (WDQ) 302. SSI module is the input level where requests from the processors 141 are muxed before entry into the SAL 151 and FL 152. Up to four processors are supported, and priority is assigned in a round-robin fashion so that no processor gets locked out. The SAL 151 and FL 152 are tightly coupled in order to ensure proper order of operation. New entries in each list are cross-checked with entries in the other list for congruence class conflicts and deferred if necessary.

Read locks are atomic operations that involve a fetch followed by a write operation (or a read lock reset operation). The fetch request enters the FL 152 and is permitted to enter the SLC Priority and Pipeline logic module 142 when all outstanding SAL 151 jobs from that particular processor 141 are completed. The read lock operation is completed by a write operation that is held not in the SAL 151 and WDQ 302, but rather in special read lock address/data registers. In addition to Read and Write pointers, the SAL 151 has a prefetch pointer that permits cache lines to be fetched early so that they're already in the "Local" state when the SAL 151 is ready to complete the write operation. This process is an optimization for performance. SAL 151 entries in the "Local" state are subject to coherency operations that may return them to the "Allocate" state. The exception to this is the entry at the Read pointer, which is not subject to returns in order to ensure forward progress in the SAL 151. WDQ 302 is four words wide, allowing an entire cache line to be written on a single clock.

Figure 4:
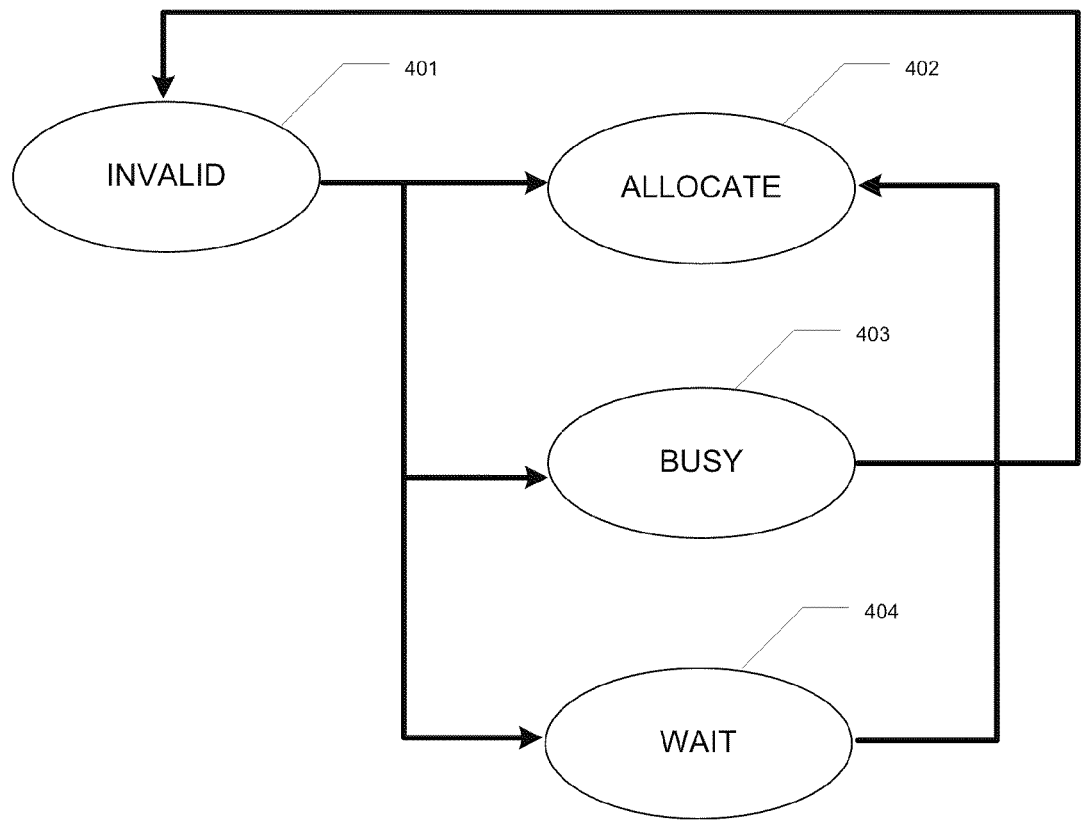
FIG. 4 illustrates a set of Fetch Request states associated with cache lines in the SLC Queue module according to an embodiment of the present invention.

FIG. 4 illustrates a set of Fetch Request states associated with cache lines in the SLC Queue module according to an embodiment of the present invention. The Fetch List has three valid states: Allocate 402, Busy 403, and Wait 404. Allocate state 402 indicates that the request has not entered the SLC Priority and Pipeline logic module 142 yet. The Fetch list also has an invalid state 401. When a request enters the SLC Priority and Pipeline logic module 142, its state goes into the "Busy" state 403. Requests that are deferred enter the "Wait" state 404. A bypass path allows new requests in the FL 152 to begin in the "Busy" state 403, but ordinarily they enter in either the "Allocate" state 402 or "Wait" state 404. New requests are compared to older requests in both the FL 151 and SAL 152. If there is an entry in either list with a matching congruence class, then the request enters the "Wait" state 404.

Table 1 illustrates the possible commands within the Fetch Request module:

| Entry number | Command | Description | Current State | Next State |
|---|---|---|---|---|
| 0 | New FL job | CC conflict with older valid FL/SAL entry | Invalid | Wait |
| 1 | New FL job | Bypass directly into pipeline | Invalid | Busy |
| 2 | New FL job | No bypass, no conflict | Invalid | Allocate |
| 3 | Memory Write | Defer condition ends | Wait | Allocate |
| 4 | Memory Write | Data arrives from memory | Busy | Invalid |

Figure 5:
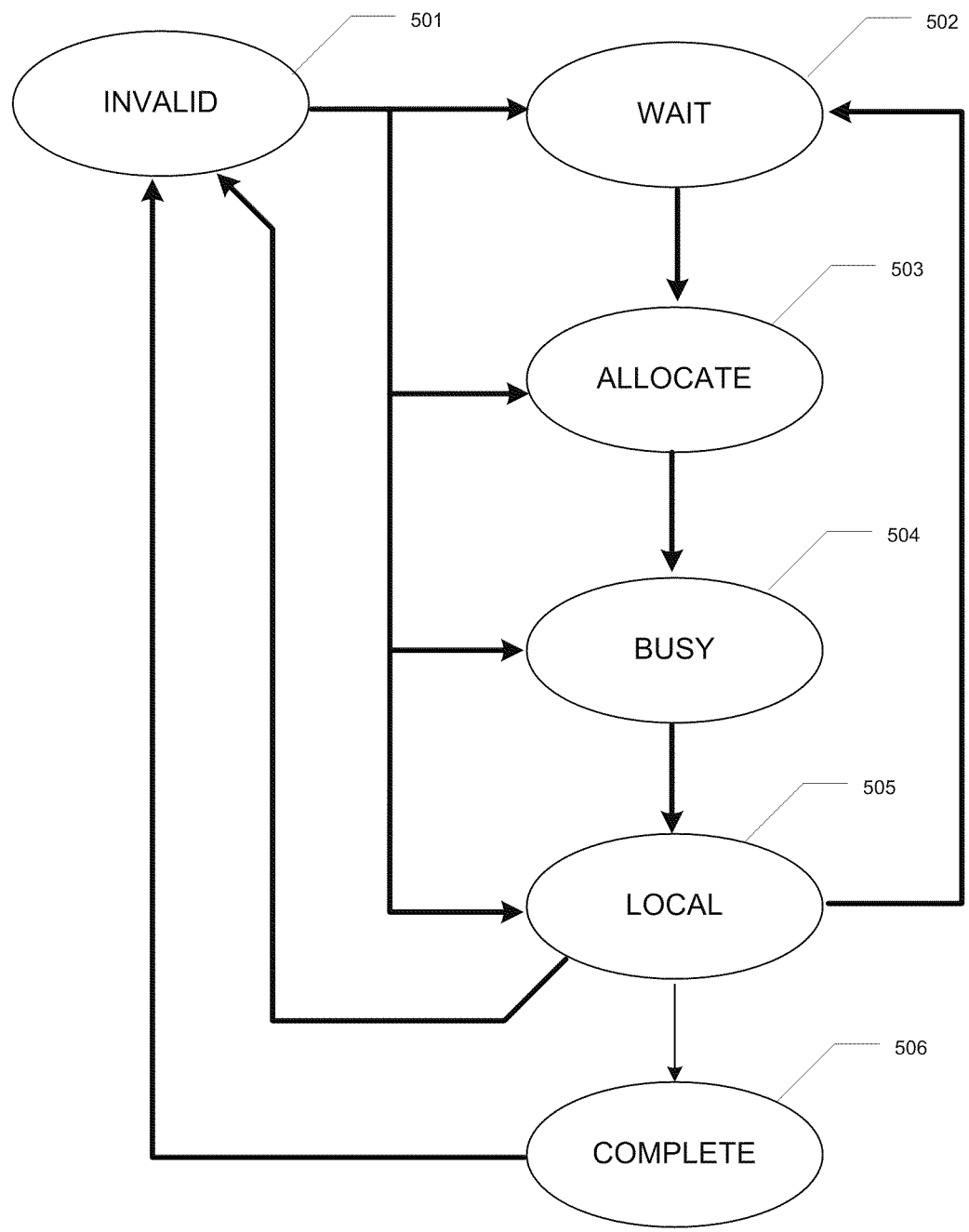
FIG. 5 illustrates a set of Store Address Request states associated with cache lines in the SLC Queue module according to an embodiment of the present invention.

FIG. 5 illustrates a set of Store Address Request states associated with cache lines in the SLC Queue module 145 according to an embodiment of the present invention. The SAL has five valid states: Allocate 503, Busy 504, Wait 502, Local 505, and Complete 506. The SAL 152 list also has an invalid state 501. An Allocate state 503 indicates that the request has not entered the SLC Priority and Pipeline logic module 142 yet. When it enters the SLC Priority and Pipeline logic module 142, its status goes into the "Busy" state 504. Requests that are deferred enter the "Wait" state 502. A Local state 505 indicates that an address is present in the SLC module 145. A Complete state 506 is an optimization that allows status information to persist after a write has completed.

Table 2 illustrates the possible commands within the Store Address Request module:

| Entry number | Command | Description | Current State | Next State |
|---|---|---|---|---|
| 0 | New SAL job | CC conflict with older valid SAL entry | Invalid | Wait |
| 1 | New SAL job | Bypass directly into pipeline | Invalid | Busy |
| 2 | New SAL job | Address matches older valid SAL entry | Invalid | Local |

-continued

| Entry number | Command | Description | Current State | Next State |
|---|---|---|---|---|
| 3 | New SAL job | No conflicts, no bypass | Invalid | Allocate |
| 4 | Memory Write | Defer condition ends | Wait | Allocate |
| 5 | Memory Write | Data arrives from memory | Busy | Local |
| 6 | Return | Return occurs before Write Complete | Local | Wait |
| 7 | Write Complete | Data written into cache | Local | Complete |
| 8 | Return | Return occurs after Write Complete | Complete | Invalid |

Figure 6:
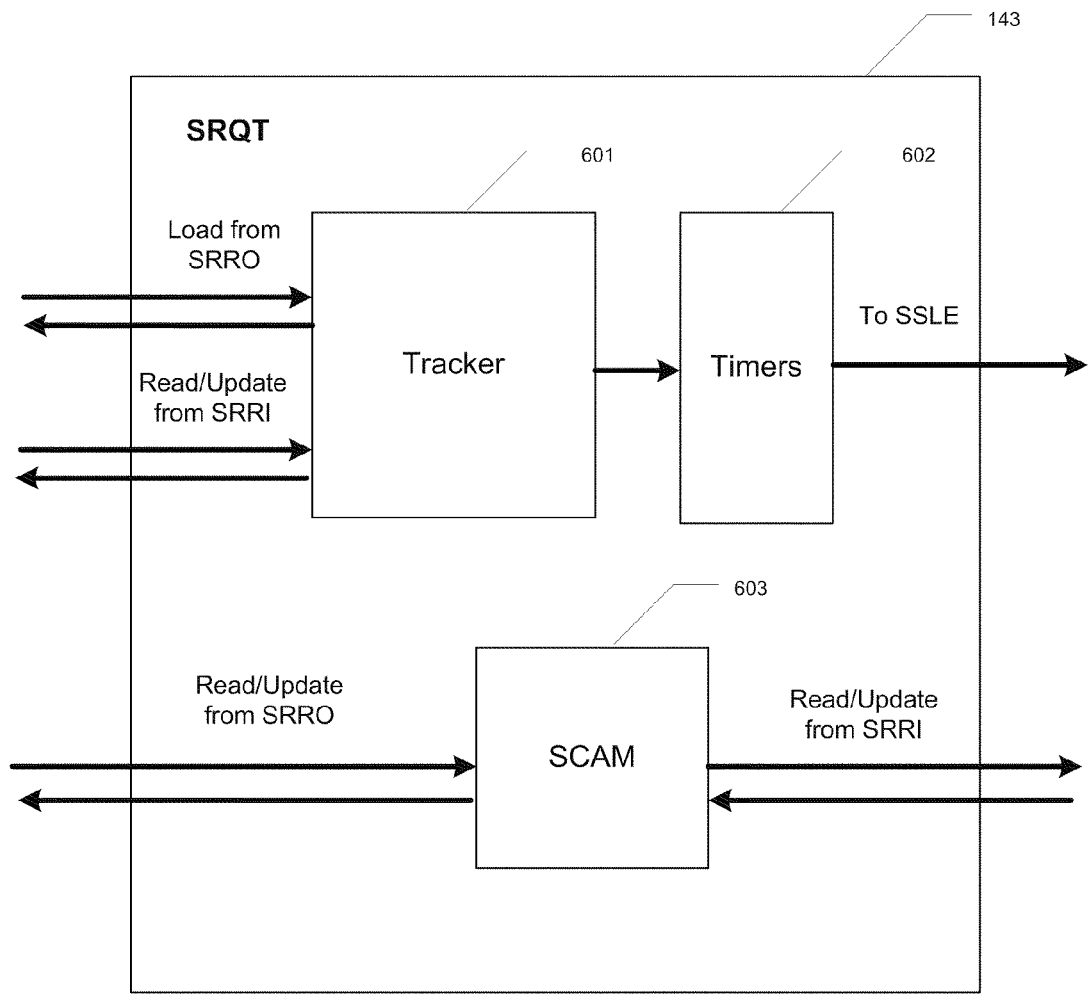
FIG. 6 illustrates an SRQT tracking module according to another embodiment of the present invention.

FIG. 6 illustrates an SRQT tracking module 143 according to another embodiment of the present invention. The SLC request tracker module (SRQT) 143 tracks the SLC requests to the Memory Coherency Director ("MCD"). It controls access to the memory. It has three main components. The first is a tracker buffer module 601 that contains all information about the request. The location in the buffer represents the transaction ID used in the request. The next component is the SLC address CAM (SCAM) 603. This contains the cache line addresses that are being tracked. It is used to provide a way to see if a snoop request matches a cache line address that we are currently processing a transaction for and to find the read request that is linked to a write operation (replace). The third component is timer modules 602 for each of the tracker entries. These timer modules 602 are used to generate a timeout error when a particular request takes too long. The duration of the timers is programmable.

The SRQT module 143 interfaces with the request/response pipeline modules (SRRO 161, SRRI 162). From SRRO module 161 it handles SCAM module 602 lookup operations and new entries to the tracker module 601, and it handles updates to the tracker module 601 caused by snoops. From SRRI module 162, it handles SCAM module 603 lookup operations and tracker module 601 lookup operations and updates to the tracker module 601.

The SRQT tracker module 601 has room for 16 read requests and 16 associated write requests caused by replaces from the cache. When a read request causes a replace, this information is placed in the tracker so that the read request will be kept valid until the write completes. At that time the request that caused the read will be deallocated from the SAL/FL. This will prevent subsequent requests for that congruence class until the read and the write have completed. This will not prevent the SLC from the delivering the read data to the processor module 141.

The SCAM module 302 is used for two purposes. The first is for snoops. A snoop request is issued by the MCD when another requestor requests a cache line and MCD believes that the cache line requested is in the cache that is snooped. When a snoop request is received by SRRI module 162, it checks the SCAM module 162 to see if an outstanding request exists for that cache line address. When a missed snoop operation is received by SRRO module 161 from SPL module, it checks the SCAM module 603 again to see is we have an outstanding request for that cache line address. The other purpose of the SCAM module 603 is to provide the correct index to put a write request operation. This operation occurs because it must be linked to the corresponding read request that caused the write.

Each tracker entry has a valid bit to indicate that the entry is active. In order to prevent overflow, the SRQT module 143 also sends a full signal to SPR when the 16 write or 16 read locations are close to being full. This limit is programmable but it must allow enough room for any transactions that have already entered the SLC Priority and Pipeline logic module 142.

The table 3 lists the status information stored in the SRQT main tracker:

| Definition | Description |
|---|---|
| Valid | Indicates that the tracker entry is valid. |
| OrigReq[3:0] | request issued that initiated USP transaction<br>b0000 reserved<br>b0001 RS<br>b0010 RO<br>b0011 RU<br>b0100 RC<br>b0101 ED<br>b0110-1111 reserved |
| spr_info[11:0] | Information from SPR about the request<br>[11] Read Lock<br>[10] Original<br>[9] Page<br>[8:5] Job number<br>[4] SAL (0 = FL, 1 = SAL)<br>[3:0] location |
| Address[33:0] | Physical address of the request |
| Home Response Received | Indicates that we have received the home response |
| Writeback Linked | Indicates that there is a linked write-back. |
| Read Snooped | Indicates that the read job was snooped and response must be sent. |
| Write Snooped | Indicates that the write-back job was snooped and response must be sent. |
| Forward Data | Received forwarded data. |
| Read Complete | Indicates that the read is complete and it waiting for the linked write to complete. |
| Write Pending | Indicates that a replace is expected but has not yet been entered into the tracker. |

The SQRT module 143 interacts with the SRRI module 162 and the SRRO module 161 to perform it operations. The SLC request/response out handler (SRRO) 161 makes new requests to the MCDs. It is a pipeline that receives inputs from various places. The first is from SLC Priority and Pipeline logic module 142. These are the new requests that may also contain data as well as snoop responses/returns. The second is from SLC non-coherent module ("SNCM"). These are interrupt requests. Finally, SRRO module 161 handles snoop responses from SLC final completion and response queue ("SFRQ").

When SRRO module 161 receives a read request from SPL it will allocate a tracker/SCAM entry using the index from SRQT module 143 and make a request to the MCD. If the read request caused a replace, SPL will indicate this to SRRO module 161 so that it can keep the read tracker entry valid until the write completes. When SRRO module 161 receives a write request (replace) from SPL it will do a congruence class compare against the SCAM module 603. This is to find the read request to link it to. The SCAM module 603 will provide the index to put the write request in the tracker. When SRRO module 161 receives a snoop miss from SPL, it must do an address compare against the SCAM module 603. If it hits, SRRO module 161 will update the tracker to indicate that the job was snooped. If it misses in the SCAM module 603, SRRO module 161 will send a snoop response to the MCD. When SRRO module 161 receives a snoop operation hit for a copy or exclusive, it will send a snoop response without data. When it receives a return from SLC Pipeline Logic ("SPL") it will send a snoop response with data.

The SRRO module 161 will also have an address mapper that will determine the destination of the request. The SRRO module 161 will be pipelined to allow it to be reading one SRQT module 143 location while writing another. When an interrupt request from SNCM is received it is mapped and sent out. Interrupts are not tracked in SRQT module 143. They are tracked in SNCM. When a response from SFRQ is received, it is sent out.

The table 4 lists the status information in the SRQT:

| Definition | Description |
| --- | --- |
| Valid | Indicates that the tracker entry is valid. |
| OrigReq[3:0] | request issued that initiated USP transaction<br>b0000 reserved<br>b0001 RS<br>b0010 RO<br>b0011 RU<br>b0100 RC<br>b0101 ED<br>b0110-1111 reserved |
| spr_info[11:0] | Information from SPR about the request<br>[11] Read Lock<br>[10] Original<br>[9] Page<br>[8:5] Job number<br>[4] SAL (0 = FL, 1 = SAL)<br>[3:0] location |
| Address[33:0] | Physical address of the request |
| Home Response Received | Indicates that we have received the home response |
| Writeback Linked | Indicates that there is a linked write-back. |
| Read Snooped | Indicates that the read job was snooped and response must be sent. |
| Write Snooped | Indicates that the write-back job was snooped and response must be sent. |
| Forward Data | Received forwarded data. |
| Read Complete | Indicates that the read is complete and it waiting for the linked write to complete. |
| Write Pending | Indicates that a replace is expected but has not yet been entered into the tracker. |

SRRO will handle each field as follows:

Valid—SRRO will set this bit when allocating a tracker entry.
OrigReq—SRRO will load this field when allocating a tracker entry.
SprInfo—SRRO will load this field when allocating a tracker entry.
Address—SRRO will load this field when allocating a tracker entry.
Home Response Received—SRRO will set this to zero when allocating a tracker entry.
Writeback Linked—SRRO will set this to 1 when allocating a read request that has a replace pending.
Read Snooped—SRRO will set this to zero when allocating a new request.
Write Snooped—SRRO will set this to zero when allocating a new request and it will set it to one if a snooped that missed in the Tag RAM hits in the SCAM on a write where the write-back is still valid
Forward Data—SRRO will set this to zero when allocating a tracker entry.
Read Complete—SRRO will set this to zero when allocating a tracker entry.
Write Pending—SRRO will set this to one when allocating a read location that has a replace pending.

The SLC request and response input handler module (SRRI) 162 processes snoop requests from MCDs, home and snoop responses from MCDs and from other caching agents, and non-coherent requests and responses. Upon receipt of a coherent response, SRRI module 162 looks up the location in SRQT module 143 based on the transaction ID and takes the appropriate action. This can include updating the status in SRQT module 143, sending the address and data to SRH0, SRH1 or loading SFRQ with a final completion. Upon receipt of a snoop request, SRRI module 162 will check the SCAM module 603 in SRQT module 143 for the cache line address being snooped and then takes the appropriate action. This can include loading SFRQ with a response, or loading SLC Priority Logic ("SPR") with a return or purge. Upon receipt of a non-coherent request or response, SRRI module 162 will forward the information to SNCM.

SRRI module 162 will be pipelined to allow it to be reading one SRQT module 143 location while writing another. SRRI module 162 has a FIFO for each requestor/responder so that we are fully buffered. When SRRI module 162 has a snoop request at the head of one of the FIFOs, it must make sure that any previous responses for that cache line address exit SRRI module 162 before the snoop operation. This can be accomplished with address compares of the response registers.

The table 5 lists the status information accessed by the SRRI in the SRQT:

| Definition | Description |
| --- | --- |
| Valid | Indicates that the tracker entry is valid. |
| OrigReq[3:0] | request issued that initiated USP transaction<br>b0000 reserved<br>b0001 RS<br>b0010 RO<br>b0011 RU<br>b0100 RC<br>b0101 ED<br>b0110-1111 reserved |
| spr_info[11:0] | Information from SPR about the request<br>[11] Read Lock<br>[10] Original<br>[9] Page<br>[8:5] Job number<br>[4] SAL (0 = FL, 1 = SAL)<br>[3:0] location |
| Address[33:0] | Physical address of the request |
| Home Response Received | Indicates that we have received the home response |
| Writeback Linked | Indicates that there is a linked writeback. |
| Read Snooped | Indicates that the read job was snooped and response must be sent. |
| Write Snooped | Indicates that the writeback job was snooped and response must be sent. |
| Forward Data | Received forwarded data. |
| Read Complete | Indicates that the read is complete and it waiting for the linked write to complete. |
| Write Pending | Indicates that a replace is expected but has not yet been entered into the tracker. |

The following shows how SRRI uses these fields.

Valid—SRRI will set this to zero when deallocating a request.
OrigReq—SRRI uses this field to determine the next action on a response.
SprInfo—SRRI will send this to SRH with a response.
Address—SRRI will send this to SRH with a response.
Home Response Received—SRRI will set this when it receives the home response.
Writeback Linked—SRRI uses this field to determine the next action on a response.
Read Snooped—SRRI will set this on a snoop request that hits a read in the SCAM when the home response has been received but the forward data has not.
Write Snooped—SRRI will set this on a snoop request that hits a write in the SCAM when the writeback is still valid.

Forward Data—SRRI will set this when it receives forwarded data.

Read Complete—SRRI will set this when a read completes but the linked write is not complete.

Write Pending—SRRI uses this along with the write valid bit to tell if a write has completed.

Figure 7:
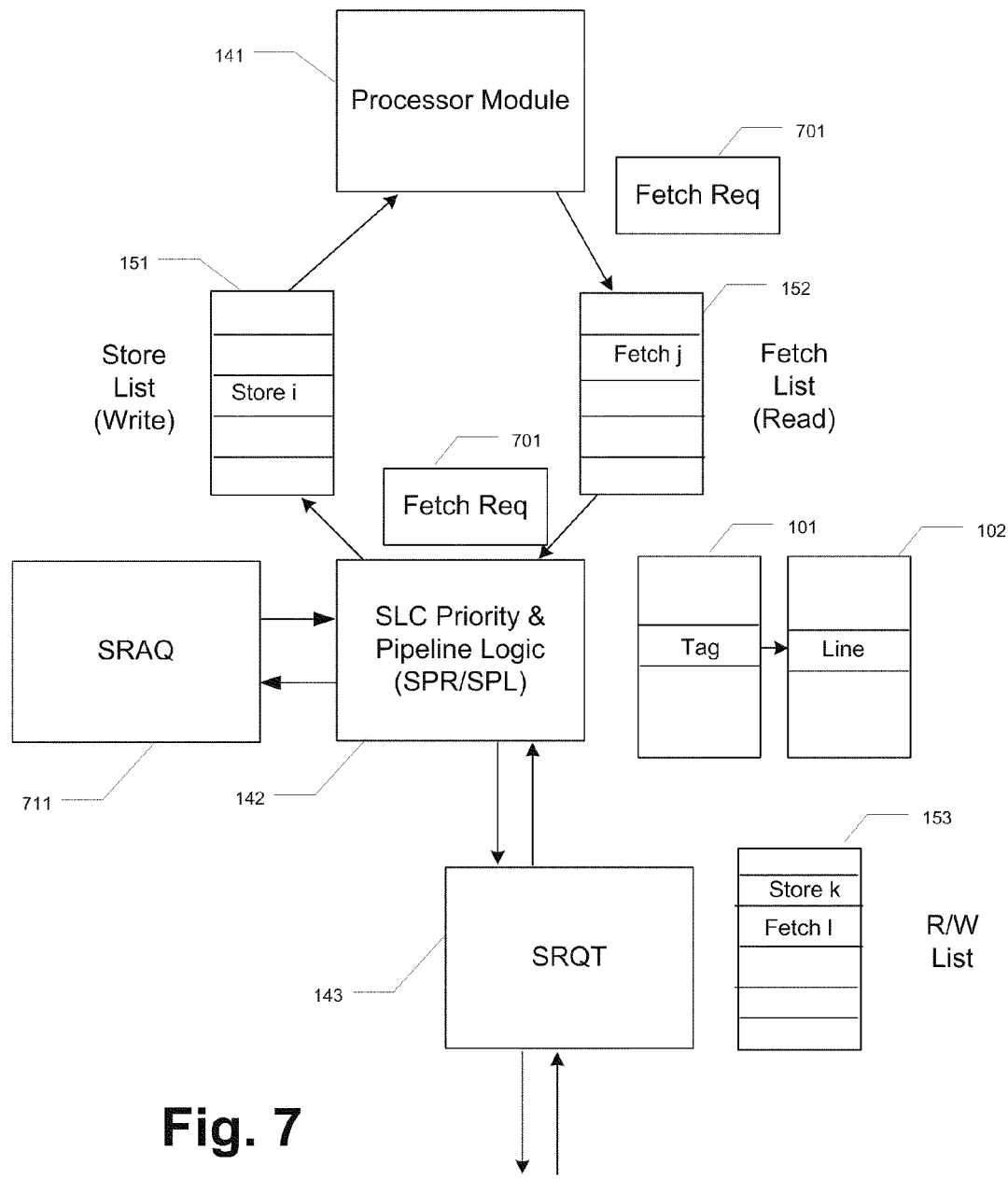
FIG. 7 illustrates an embodiment of a cache coherency processing system as requests are processed in the cache according to the present invention.

FIG. 7 illustrates an embodiment of a cache coherency processing system as requests are processed in the cache according to the present invention. We believe that the mechanism of linking writes to the reads in order to delay the invalidation of the read in the SAL/FL to maintain deferrals until the complete of the write is a unique mechanism.

The following is an example step by step process that illustrates the method used. A fetch request 701 enters the FL 152 from the processor. The fetch request 701 is sent to SLC Priority and Pipeline logic module 142 to do a lookup of the cache. The fetch operation misses in the cache and causes an eviction.

The fetch is sent to SLC Request/Response Out Module (SRRO) 161 and the eviction loads the replace queue (SRAQ). The SRAQ is loaded by SPR/SPL and read by SPR/SPL 142. The fetch request 701 is sent to memory as a read and loads an entry in the tracker module 143 (SRQT). The eviction is processed and gets the data out of the cache. The eviction is sent to SRRO module 161.

The eviction is sent to memory as a write and loads an entry in the tracker module 143 which is linked to the previous read if it is still valid. The response to the read operation is received in SLC Request/Response In Module (SRRI) 162. The data is sent to the processor module 141 and the cache but the FL 152 is not yet invalidated because the write has not yet completed.

The response to the write is received in SRRI module 162. The FL module 152 entry is invalidated. Any subsequent request from the processor in the SAL/FL that was deferred against this request is now allowed to proceed.

While the above embodiments of the present invention describe the interaction of a random security token inserted onto a stack between an input data buffer and a return address storage location, one skilled in the are will recognize that the use of the random security token value stored between these data structures may also be used in other portions of memory other than a stack. As long as the random security token is placed between the input buffer and storage locations containing instruction addresses given the order in which the input buffer is filled, and as long as the random security token is checked prior to the usage of be instruction addresses stored in the corresponding memory locations, the present invention to would be useable in non stack based memory structures. It is to be understood that other embodiments may be utilized and operational changes may be made without departing from the scope of the present invention.

The foregoing description of the exemplary embodiments of the invention has been presented for the purposes of illustration and description. They are not intended to be exhaustive or to limit the invention to the precise forms disclosed. Many modifications and variations are possible in light of the above teaching. It is intended that the scope of the invention be limited not with this detailed description, but rather by the claims appended hereto. Thus the present invention is presently embodied as a method, apparatus, computer storage medium or propagated signal containing a computer program for providing a method, apparatus, and article of manufacture for detecting and preventing input data buffer overrun.

What is claimed is:

1. A system for providing a cache memory coherency mechanism within a multi-processor computing system utilizing a shared memory space across the multiple processors, the system comprising:
   a store address list for storing cache line addresses corresponding to a cache line write request issued by one of the multiple processors;
   a fetch address list for storing cache line dresses corresponding to a cache line fetch request issued by one of the multiple processors;
   a priority and pipeline module;
   a request tracker module; and
   a read/write address list;
   wherein
   the store address list and the fetch address list are queues containing result in cache lookup requests being done by the priority and pipeline module;
   each entry in the store address list and the fetch address list possess status bits which indicate the state of the request; and
   the request tracker module links the cache line write requests to fetch requests in order to delay a invalidation of the fetch request in order to maintain deferrals until the completion of the write request.

2. The system according to claim 1, wherein the system further comprises:
   an SRRO module for processes SCAM module lookup operations and new entries to the request tracker module, and processes updates to the request tracker module caused by snoops operations; and
   an SRRI module for processes lookup operations and updates sent to the request tracker module.

3. The system according to claim 2, wherein the system further comprises:
   a tag field;
   a congruence class address; and
   a bits field.

4. The system according to claim 2, wherein the system further comprises a SRAQ module for maintaining pending cache line eviction requests.

5. The system according to claim 3, wherein the tag field corresponds to bits 33:20 of the address of the cache line and corresponds to a value stored in a Tag Ram.

6. The system according to claim 3, wherein the congruence class address corresponds to bits 19:4 of the address of the cache line is used to address a Tag Ram.

7. The system according to claim 3, wherein the bits field corresponds to bits 3:0 of the address of the cache line and determines the size of a cache line.

8. The system according to claim 3, wherein status of the entry in the store address list and the fetch address list comprises:, an invalidated state, a wait state, a busy state, and an allocate state.

* * * * *